United States Patent [19]

Reeder et al.

[11] Patent Number: 4,969,923

[45] Date of Patent: Nov. 13, 1990

[54] SAFETY LATCH

[75] Inventors: Scot C. Reeder; Gregory R. Beck, both of Lawrence, Kans.

[73] Assignee: Aeroquip Corporation, Jackson, Mich.

[21] Appl. No.: 360,129

[22] Filed: Jun. 1, 1989

[51] Int. Cl.[5] .................. F16L 19/00; A44B 17/00
[52] U.S. Cl. ............................ 285/365; 285/924; 285/420; 285/409; 24/270; 24/273
[58] Field of Search ............... 24/270, 273; 285/365, 285/364, 406, 407, 420, 409, 924

[56] References Cited

U.S. PATENT DOCUMENTS

| | | | |
|---|---|---|---|
| 1,518,479 | 12/1924 | Brewer | 24/273 |
| 2,390,801 | 12/1945 | Markey | 24/273 |
| 2,579,975 | 12/1961 | Scott et al. | 24/270 |
| 2,846,244 | 8/1958 | Parker | 24/273 |
| 4,164,804 | 8/1979 | Fletcher | 24/273 |
| 4,382,570 | 5/1983 | Craig | 24/270 X |

FOREIGN PATENT DOCUMENTS 0674416 11/1963 Canada .................. 285/365
0937264 12/1955 Netherlands .............. 285/407

Primary Examiner—Dave W. Arola
Assistant Examiner—Carol I. Bordas
Attorney, Agent, or Firm—Beaman & Beaman

[57] ABSTRACT

A circumferential safety latch clamp for securing a pair of pipe members together operated by a lever actuator wherein a lever is pivotally mounted upon one end of the clamp band positionable between a latch position and an open position having portions releasably engagable with an anchor mounted on the other end to draw the band ends toward each other. A retainer assembly limits movement of the lever in the opening direction to a safety release position whereby the lever portions maintain engagement with the anchor limiting displacement of the band ends away from each other allowing partial expansion of the clamp band.

3 Claims, 1 Drawing Sheet

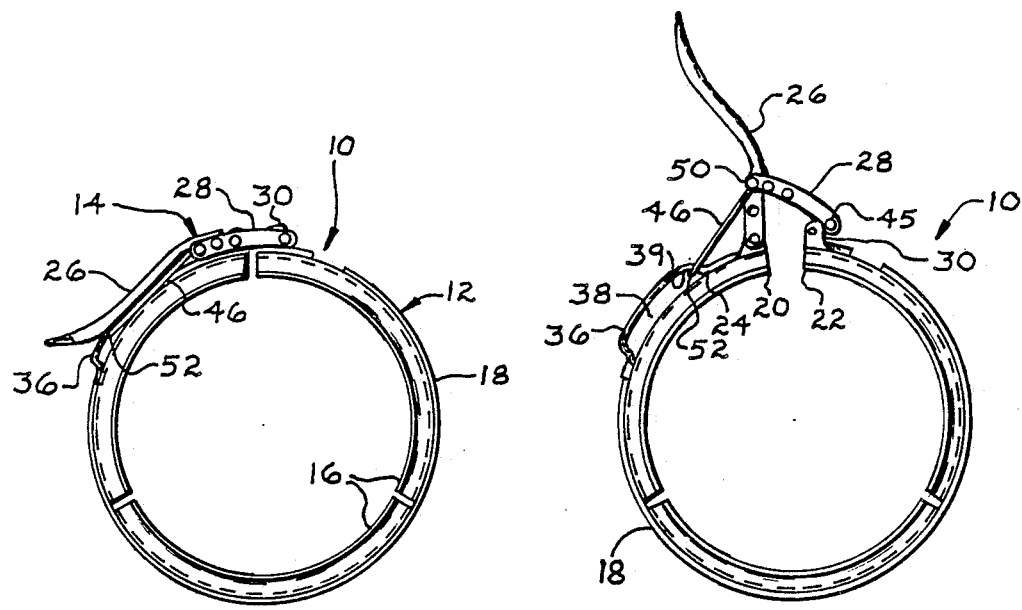
Fig 1
Fig 2
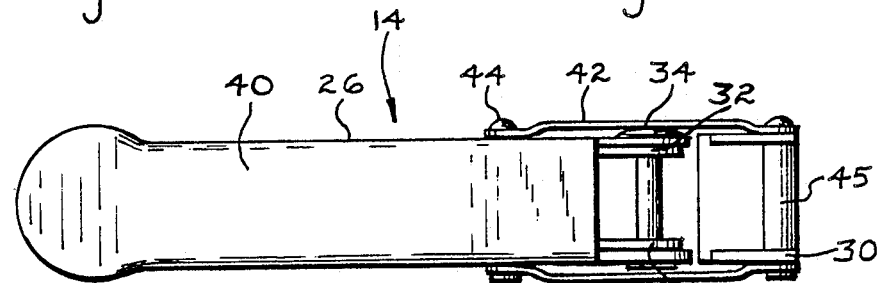
Fig 3
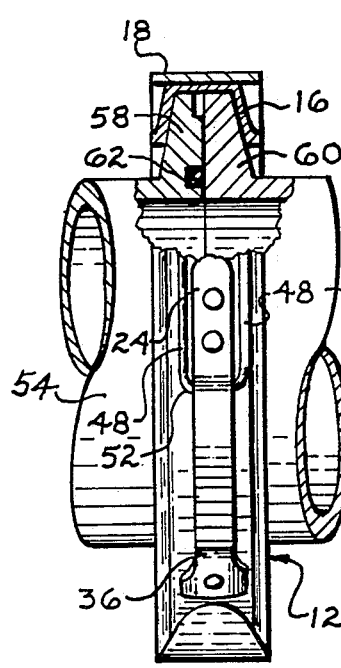
Fig 4
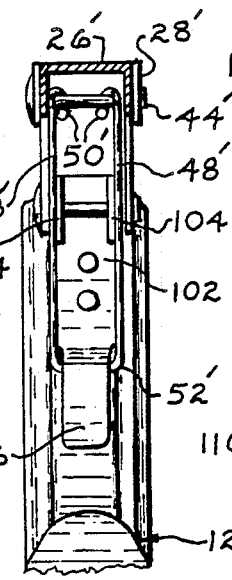
Fig 6
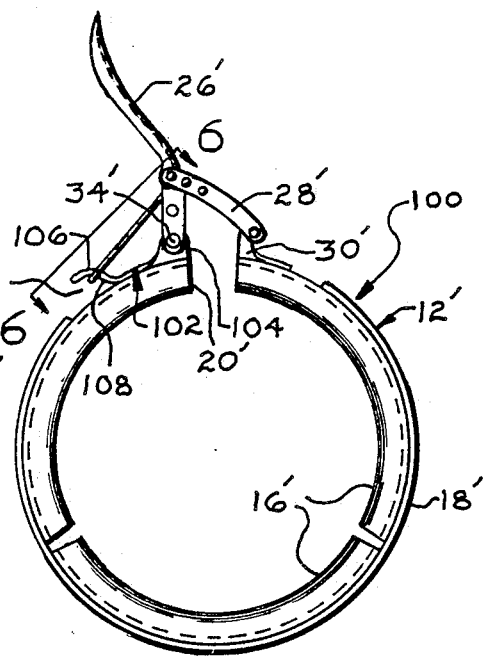
Fig 5

SAFETY LATCH

BACKGROUND OF THE INVENTION

Circumferentially contractible clamps are widely used to clamp pipe members or the like in an end-to-end sealed relationship. Such contractible clamps usually consist of a band or strap adapted to encircle the end flanges of the pipe members to be connected, or the band may consist of a plurality of interconnected elements. The ends of the band are interconnected by an actuator capable of drawing the ends toward each other, and the actuator often takes the form of an over-center lever assembly. In a contractible clamp using an over-center lever assembly the lever is usually pivotally mounted to one end of the band having portions releasably engagable with an anchor mounted on the other end. Operation of the lever between a latch position and an open position actuates the band ends toward and away from each other contracting and expanding the band about the end flanges of the objects being connected. Typical examples of these types of clamps are shown in U.S. Pat. Nos. 1,646,463; 3,964,774; 4,008,937 and 4,123,095.

Contractible band clamps of the aforementioned type are relatively simple to operate and may be quickly applied and removed, however, upon actuating the lever towards the open position, resilience of the band causes the lever to "swing" open uncontrollably and the clamp to fully expand rapidly releasing the connected pipe members. Often, the clamps are employed with pipe members connected under pressure, and if pressure is present during opening of the clamp, the associated pipe members could suddenly separate possibly resulting in serious injury to the operator or damage to the pipe members. Thus, there is a definite need for an over-center lever actuated clamp to have a safety feature allowing pressure, if present, to be safely released during opening of the clamp, but heretofore, an over-center lever actuated clamp provided with such a feature has not been available for use.

It is an object of the invention to provide a contractible clamp operable by an over-center lever actuator for securing a pair of conduit members together wherein the clamp is easily applied and removed, economical to manufacture, and wherein a safety retainer is provided allowing controlled release of pressure, if present, during opening of the clamp preventing a sudden separation of the conduit members.

It is another object of the invention to provide a contractible clamp operable by an over-center lever actuator for securing a pair of conduit members together having a band portion adapted to embrace the flange ends to be connected and a pivotally mounted lever movable between a latched position and an open position operatively associated with the band to facilitate contraction and expansion of the band about the flange ends, wherein a retainer assembly limits movement of the lever in the opening direction for controlling release of pressure, if present, in the event of inadvertent opening of the clamp.

In the practice of the invention the contractible safety latch clamp includes a band adapted to embrace end flanges of a pair of conduit members to be connected and an over-center lever actuator pivotally mounted upon one end of the band portion having a link pivotally mounted thereon releasably engagable with an anchor mounted on the bands other end. The band ends are displacable toward each other in association with the movement of the lever between a latch position and an open position. A U-shaped retainer bail having a pair of legs interconnected to a base is pivotally mounted to the lever and as the lever is pivoted between the latch and open positions the base of the bail slides along the outer surface of the band in the same direction as that of the lever movement. A clip is mounted to the band outer surface and has a seat portion adapted to abut with the bail base to limit movement of the lever in the opening direction. In one embodiment the clip is open at one end and as the lever moves in the opening direction the base of the bail slides through the open end and engages the seat, while in another embodiment the clip is closed trapping the base of the bail in a slot defined between the clip and the band adjacent the seat portion.

In both embodiments, opening of the clamp is accomplished by applying a lifting force on the lever in the direction of the open position necessary to overcome the tension forces maintaining the lever in the over-center latch position whereby resilience of the bands causes the lever to "swing" open. As the lever continues to "swing" the bail base slides along the band surface until it engages the clip seat causing the lever to stop in a safety release position. In the safety release position, the link maintains engagement with the anchor permitting limited separation of the band ends allowing the band to expand enough to break the seal of the connected conduit members, which is important if the clamp is used in high pressure conduit installations, whereby any pressure within the pipe members can be safely released. Removing the link out from engagement with the anchor frees the band ends with respect to each other, and the clamp can be fully expanded and removed.

BRIEF DESCRIPTION OF THE DRAWINGS

The aforementioned objects and advantages of the invention will be appreciated from the following description and accompanying drawings wherein:

FIG. 1 is an elevational view of a circumferentially contractible clamp constructed in accord with the inventive concepts of the invention, the clamp being shown in the latched condition, FIG. 2 is an elevational view of the clamp of FIG. 1 showing the clamp in the safety release condition, FIG. 3 is a top plan view of the lever actuator assembly of the clamp of FIGS. 1 and 2, FIG. 4 is a fragmentary, partly sectional view of a pair of flange end conduit members being connected together by a clamp constructed in accord with the invention, FIG. 5 is another embodiment of a clamp constructed in accord with the invention, the clamp being shown in the safety release condition, and FIG. 6 is an elevational view as taken along Section VI—VI of FIG. 5.

DESCRIPTION OF THE PREFERRED EMBODIMENTS

In FIGS. 1–4 a first embodiment of a contractible clamp constructed in accord with the inventive concepts of the invention is shown generally indicated at 10. The clamp 10 includes a band 12 adapted for receiving abutting pipe or conduit end flanges and a lever actuator assembly generally indicated at 14 pivotally mounted on the band to facilitate contraction and expansion of the band about the flanges for releasably connecting the pipe members together. The band 12 consists of inner arcuate segments 16 and a generally circular outer strap 18 spot welded to the segments 16 to form an integral unit.

The arcuate segments 16 have a generally V-shaped cross section, as will be appreciated from FIG. 4 and the outer strap 18 has a flat cross section and circumferentially engages the base of the segments 16. The band 12 has ends 20 and 22 whereon the actuator assembly 14 is mounted.

The actuator assembly 14 includes a saddle 24, a lever 26, a link 28 and a hasp 30. The saddle 24 is spot welded to the band 12 on end 20 and includes a pair of spaced parallel legs 32 extending in a common direction having holes therein for receiving a pivot pin 34. The saddle 24 also includes a clip 36 being closed at both ends defining a slot 38 having a seat portion 39 engagable with a bail 46. The lever 26 includes a handle portion 40 at one end and is pivotally mounted at the other end to the pivot pin 34 whereby heading the pivot pin 34 over at each end permanently affixes the lever 26 to the legs 32 permitting the lever to be pivoted relative to the band end 20 between a latch position, FIG. 1, and an open or safety release position, FIG. 2.

The link 28 includes a pair of parallel arms 42 having holes formed therein at one end for receiving a pivot pin 44 mounted on the lever, whereby heading the ends of the pin 44 over permanently affixes the link 28 to the lever 26 permitting the link to pivot relative thereto. A bolt or pin 45 is mounted on the other end of the arms releasably engagable with the hasp 30 for limiting displacement of the band ends 20 and 22 away from each other.

The bail 46 is of a U-configuration and is mounted to the lever at pin 44 to limit movement of the lever in the opening direction. The bail 46 includes a pair of substantially parallel legs 48 each being rolled back at end 50 forming a loop and interconnected at the other end to a base 52. Thus, it will be appreciated that the loop ends 50 will be pivotally received by the pin 44, and the base 52 will be slidably received in the slot 38 as will be appreciated from FIGS. 1 and 2.

By way of example, the clamp of FIGS. 1–4 is used to maintain assembly of pipe or conduit members 54 and 56, FIG. 4. The pipe member 54 has a radially outwardly extending flange 58 and the pipe member 56 has a radially outwardly flange 60. Each of the flanges 58 and 60 has a flat end adapted to abut with one another and an outer tapered surface, whereby when the flat ends are abutting the tapered surfaces form a generally V-configuration receivable by the arcuate segments 16 as appreciated in FIG. 4. Upon abutting the pipe members in an end-to-end relationship, the joined flanges are received by the band 12, FIG. 4 and contraction of the band 12 upon the flanges produces radial and axial forces on the pipe ends due to the tapered surfaces and configuration of the arcuate segments drawing the flanges toward each other into a sealing engagement with an 0 ring 62.

To use the clamp 10, initially, the lever 26 is in the open position, FIG. 2, and the ends 20 and 22 are separated such that hasp 30 is separated from the bolt 45 permitting placement of the clamp about the pipe members.

Upon the band 10 being located as desired upon the pipe ends, the link bolt 45 is manually placed over the hasp 30, FIG. 2, and pivoting the lever 26 in a counterclockwise direction towards the latch position of FIG. 1 draws the band ends toward each other compressing the band 12 to the opposed flanges, whereby tension forces maintain the lever in the latch position as the pin 45, pin 34 and pin 44 are pivoted to an over-center relationship. As the lever 26 is pivoted in either the clockwise or counterclockwise direction the bail base 52 merely slides along the surface of the band 12 within the slot 38 in the same direction as that of the lever movement.

Opening of the clamp 10 is accomplished by merely applying a force to the handle 40 in a clockwise direction necessary to overcome the tension forces maintaining the lever in the over-center latch position whereby resilience of the band cause the lever to "swing" in the clockwise direction. As the lever moves in the clockwise direction the band ends 20 and 22 are displaced away from each other causing the band to expand as the bail base 52 slides along the band outer surface within the slot 38. Swinging of the lever continues until the base 52 engages the seat 39 thereby causing the lever to stop in the safety release position, FIG. 2, limiting further displacement of the band ends away from each other.

In the case when the clamp band 10 is employed with pressurized pipe members the limited expansion of the band 12, in the safety release position, would be enough to allow the flange ends 58 and 60 to partially separate causing the seal at 0 ring 62 to break and allowing any pressure, if present, to be safely released as the band 12 embraces the flange ends to prevent a sudden separation of the pipe members 54 and 56. Then by removing the handle link 28 out from the hasp 30 the clamp 10 can be fully expanded and removed.

In FIGS. 5 and 6 a second embodiment of a contractible clamp constructed in accord with the inventive concepts of the invention is shown generally indicated at 100. The clamp 100 is substantially identical to that of the clamp 10 the only difference being that the saddle 24 of clamp 10 has been modified to the saddle of 102 whereby the saddle 102 serves the same purpose as that of the saddle 24 of clamp 10. All of the other components of the clamp 100 are identical and function in the same manner as those of clamp 10 and are indicated by primed reference numerals.

The saddle 102 of clamp 100 is spot welded to the band 12' on end 20' and includes a pair of spaced parallel legs 104 extending in a common direction having holes therein for receiving the pivot pin 34' whereon the lever 26' is pivotally mounted. The saddle also includes a clip 106 and the clip 106 corresponds to the clip 36 of the clamp 10 in that it has a seat portion 108 adapted to abut with the bail base 52', however the clip 106 is open at the other end 110. As the lever 26' is pivoted in the opening direction the bail base 52' slides along the outer surface through the open end 110 until it engages the seat 108 limiting movement of the lever to a safety release position as shown in FIG. 5. The clamp 100 can then be fully expanded in the same manner as that previously described for the clamp 10 or the bail base 52' can be manually removed from the seat portion 108 allowing further movement of the lever in the opening direction until the link 28' disengages from the hasp 30'.

It is appreciated that various modifications to the inventive concepts may be apparent to those skilled in the art without departing from the spirit and scope of the invention.

We claim:

1. A circumferential safety latch clamp for releasably connecting aligned, flange conduit ends with respect to one another, said clamp operable by an over-center lever actuator pivotable about an axis parallel to the longitudinal axis of the conduit members being clamped, including a contractible band adapted to encircle the flange ends of the conduit members being clamped, first and second ends defined upon the band disposed adjacent to and displaceable toward each other, a lever pivotally mounted upon the first end positionable between a latch position and an open position, as anchor mounted upon the second end, the lever and anchor having portions releasably engageable with each other being adapted to be operatively associated, the pivoting lever drawing the ends toward each other and limiting displacement of the ends away from each other, the improvement comprising restricting means defined on the clamp lever permitting limited movement of the lever in the opening direction to a partially open safety release position, said restricting means comprising a retainer mounted on the lever for movement with the lever, a retainer seat mounted on the band, said retainer engaging with said seat upon pivoting of the lever to a predetermined partially open position preventing further pivoting of the lever in the opening direction.

2. In a safety latch clamp as in claim 1, said restricting means retainer comprising a U-shaped bail having a base and legs extending from said base in a common direction therefrom, the free ends of said legs being pivotally mounted to a pin mounted on the lever and said base being adapted to slide along the band, and said retainer seat comprising a clip mounted on the band adjacent the lever having a first end attached to the band defining a seat adapted to abut with said sliding base.

3. In a safety latch clamp as in claim 2, said clip having a second end attached to the base circumferentially spaced from said first end whereby said clip defines a closed slot trapping said sliding base between said clip and said band.

* * * * *